United States Patent
Ekström (10) Patent No.: US 9,404,611 B2
(45) Date of Patent: Aug. 2, 2016

(54) QUICK COUPLING FOR PIPES/HOSES WITH LOCKING FEATURE

(75) Inventor: Jörgen Ekström, Skövde (SE)

(73) Assignee: CEJN AB, Skövde (SE)

( * ) Notice: Subject to any disclaimer, the term of this patent is extended or adjusted under 35 U.S.C. 154(b) by 226 days.

(21) Appl. No.: 14/125,205

(22) PCT Filed: Apr. 19, 2012

(86) PCT No.: PCT/SE2012/050419
§ 371 (c)(1),
(2), (4) Date: Dec. 10, 2013

(87) PCT Pub. No.: WO2013/002699
PCT Pub. Date: Jan. 3, 2013

(65) Prior Publication Data
US 2014/0117664 A1    May 1, 2014

(30) Foreign Application Priority Data
Jun. 30, 2011 (SE) .................................... 1150606-0

(51) Int. Cl.
*F16L 21/00* (2006.01)
*F16L 37/244* (2006.01)
(Continued)

(52) U.S. Cl.
CPC ............. *F16L 37/244* (2013.01); *F16L 37/113* (2013.01); *F16L 37/23* (2013.01)

(58) Field of Classification Search
USPC ........................................ 285/316, 317, 402
See application file for complete search history.

(56) References Cited

U.S. PATENT DOCUMENTS

| 1,580,694 A | 4/1926 | Smith |
| 2,972,491 A | 2/1961 | Dutton |
| 3,218,025 A | 11/1965 | Abelson et al. |

(Continued)

FOREIGN PATENT DOCUMENTS

| FR | 887025 A | 11/1943 |
| GB | 647299 A | 12/1950 |

(Continued)

OTHER PUBLICATIONS

Thorén, Magnus, "International Search Report" for PCT/SE2012/050419, as mailed Sep. 17, 2012, 5 pages.

*Primary Examiner* — Aaron Dunwoody
(74) *Attorney, Agent, or Firm* — Winstead PC (57) ABSTRACT

The invention relates to a coupling comprising a first (3, 3') and a second (5,5') coupling part being adapted for coupling together and uncoupling along a centre axis (CL) extending through the coupling (1), an outer surface (7) of the first coupling part (3, 3') comprising at least a recessed helical slot (9), an inner surface (11) of the second coupling part (5, 5') having at least one projection (13, 13', 13") extending inwards for engagement with the said slot (9). The second coupling part (5, 5') comprises a lock socket arrangement (17, 19) being displaceable relatively to its rear portion (15) along a centre line (CL) and having an inwards projecting portion (23, 23', 23"), at least one lock body (25, 25', 25") arranged in the second coupling part (5, 5) being movably arranged relatively to the lock socket arrangement (17, 19) and by means of retention means (27, 27') being connected to the rear portion (15), the outer surface (7) comprising a collar (29) for receiving the lock body (25, 25', 25") affected by the projecting portion (23, 23', 23") at the said coupling together.

12 Claims, 6 Drawing Sheets

(51) Int. Cl.
   *F16L 37/23* (2006.01)
   *F16L 37/113* (2006.01)

(56) References Cited

U.S. PATENT DOCUMENTS

| | | | | |
|---|---|---|---|---|
| 3,267,963 A | * | 8/1966 | Hupp | F16L 37/23 285/316 |
| 3,413,018 A | | 11/1968 | Francis | |
| 2004/0244848 A1 | | 12/2004 | Maldavs | |
| 2010/0133457 A1 | | 6/2010 | Ekstrom et al. | |

FOREIGN PATENT DOCUMENTS

| GB | 2069083 A | 8/1981 |
|---|---|---|
| SE | 433121 B | 5/1984 |
| SE | 531081 C2 | 12/2008 |
| WO | WO-2008151596 A2 | 12/2008 |

* cited by examiner

QUICK COUPLING FOR PIPES/HOSES WITH LOCKING FEATURE

FIELD OF THE INVENTION

The invention relates to the coupling manufacturing industry. The invention relates to couplings for coupling together of pressure pipe and return pipe for transferring liquids or gas. In particular, the invention relates to couplings that can be used by safety personnel.

BACKGROUND OF THE INVENTION

Today, couplings are available in different embodiments. There the coupling parts that are screwed together. There are also coupling parts which are coupled together by means of bayonet coupling. The present invention relates to a coupling with bayonet socket.

Various constructions exist for locking together the female part and the male part of the coupling. It has been desirable to construct a lock which is easily handled and at the same safe.

GB 2 069 083 describes a coupling with lock by means of a safety sleeve with L-shaped slots secured to the female part. The male part is locked tight by means of the said slots. The safety sleeve prevents the male part from uncontrollably slipping out of the female part due to involuntary uncoupling.

GB 647299 discloses a coupling with a male part comprising taps rotated in bayonet slots in a lock sleeve secured to the female part. Locking plugs are uncoupled from the male part by application of a predetermined force so that the male part can be wriggled out from the female part.

SE 433121 discloses a coupling where the coupling halves are coupled together and locked in that a lock sleeve is rotated a quarter of a turn so that a lock collar gets into engagement with a locking flange whereby the locking segment is pushed into the recesses by means of a locking spring.

SE 531 081 discloses a coupling for coupling together a pressure pipe and a return pipe. The coupling allows rapid connection and is used by rescue personnel. By rotating a lock sleeve coupled to a pin, a nipple part is pulled into the female part. The rotation of the lock sleeve by the pin has exchanging effect, and at completed rotation of the lock sleeve the pin has locked the nipple part through bayonet locking in the helical groove of the nipple part. This construction shown in SE 531 081 functions satisfactorily, but it is an object to make the coupling with additional safety function.

It is now desirable to provide a coupling which allows safe locking as compared to existing couplings on the market.

It is desirable that at the same time such a coupling is easy to handle.

It is also the object to provide a coupling with an uncomplicated locking function so as to cause as little as possible change at the manufacturing of couplings with bayonet function on the market today.

It is also an object to provide a coupling which in coupled state can be dragged in the field or in case of another stopping hindrance in the direction towards a site of an accident without risk of uncoupling.

SUMMARY OF THE INVENTION

Thus, a coupling has been provided which exhibits a locking function which is safe. The locking function has been achieved by simple means, and only small adjustments to the already existing couplings have been required. At the same time, handling at coupling and uncoupling of the coupling is simple, which is of importance to, for example, rescue personnel.

Preferably, the lock sleeve arrangement is tensioned in the direction towards the rear part by means of a spring for returning the lock sleeve arrangement to a starting position in which the projecting portion gets into contact with the lock body.

In that manner, involuntarily uncoupling of the coupling is avoidable. The pressure spring thus automatically returns the lock sleeve to the starting position (the position in which the projecting portion affects the lock body in radial direction towards the centre line).

Expediently, the lock sleeve arrangement is fitted with a space so that in the projected position of the lock sleeve arrangement the space allows the lock body to move in the peripheral direction from the collar.

Thereby the first coupling part can be freely displaced in the direction of the centre line relatively to the second coupling part. This is effected partly by inserting the coupling parts into each other, partly by the displacement itself of the coupling parts along the centre axis relatively to each other. Advantageously, at the displacement the lock body rests freely against the outer surface encasing the helical slot of the first coupling part. Uncoupling is effected in that the lock sleeve is displaced in the direction from the rear body and is subsequently suitably rotated counter-clockwise.

Alternatively, a space can be made in the same manner, however, in a, regarding the lock sleeve arrangement, rearwardly displaced position, and the starting position corresponds to an advanced position.

Preferably, the retention means are designed in such manner that the collar of the lock body corresponds to a profile edge of the helical slot.

In this way unintended uncoupling is prevented in that by engagement in the helical slots the projections hold together the first coupling part and the second coupling part, above all in the axial direction simultaneously with the locking means being pressed down into the helical slot/the helical slots by means of the projecting portion of the inner surface of the lock sleeve and thereby being pressed against the profile edge of the respective helical slots constituting the collar.

Expediently, the helical slot ends by a bending angle extending at an open angle towards the main pitch angle of the helical slot.

The bending angle corresponds to a bending angle which exhibits an open or obtuse angle relatively to the main pitch angle of the helical slot. Thereby, the helical slot of the first coupling part gets to have effect in different directions for the locking points as to the locking point of the projection and the locking point of the locking means, respectively, (corresponding to the point of the collar). This means that the oppositely directed force in the locking point of the projection will get to act in line with the extension of the bending angle, and the oppositely directed force in the locking point of the locking means gets to act in line with the pitch of the helical slot. This entails that the tolerance sensitivity can be reduced simultaneously with the locking being reinforced.

Preferably, the retention means are constituted by an inner sleeve around which a lock sleeve of the lock sleeve arrangement is displaceably disposed.

By simple manufacturing a hole can thereby be accommodated in the inner sleeve, in which hole the locking means (such as a ball, tap etc) can rest loosely. Expediently, the locking means are pressed down into the hole by the projecting portion of the lock sleeve to such extent that the locking means get into engagement with the said collar when the lock sleeve is in the starting position. Alternatively, the lock body is a ball, or a tap, or another suitable lock body.

Expediently, the lock body is constituted by a ball or tap. In this way the lock body can roll freely in the said hole and fall freely out into the space formed between the helical slot and the lock sleeve when the lock sleeve is in the advanced position.

Alternatively, for the coupling together the lock sleeve is arranged displaceably along the centre axis in the direction from the rear portion and acting on the projection for engagement with the slot at rotational movement of the lock sleeve so that in the advanced position of the lock sleeve a space is made available in which the lock body can move in the direction from the centre axis allowing the first coupling part to move relatively to the second coupling part.

Preferably, the at least one projection comprises a tap or ball. Hereby the pulling together can take place at high precision, and large abutment surface between projection and slot can be obtained. Expediently, the tap rests with play secured in the inner sleeve.

Expediently, the projection is constituted by a ball which rests loosely in the inner sleeve. In this manner a small rolling friction is obtained.

Alternatively, the number of helical slots is two, and the number of projections is two. The number could be even higher. The number of lock bodies corresponds to the number of expedient numbers of slots, but could be higher or lower.

Expediently, the outer surface of the lock sleeve arrangement has a user-friendly handle. Thereby a rescue person can safely connect rescue tools to a pressure source.

Expediently, the lock sleeve arrangement is, by means of engagement means, adapted for affecting projections for engagement with the slot, said engagement means being adapted so as to be movable in the direction of the centre axis. The engagement means are expediently a guide pin (or screw, peg, etc.) which transfers the rotational movement of the lock sleeve into rotational movement of the projections for pulling together or pushing apart the coupling parts by the engagement of the projections in the helical slots.

Expediently, the engagement means are secured to the lock sleeve arrangement and extend through longitudinally extending slots of the retention means. The retention means are thus constituted by an inner sleeve, and the guide pin is expediently secured to the lock sleeve and extends through longitudinal slots of the inner sleeve extending parallely to the centre sleeve. In this way the lock sleeve is secured in rotation-stable manner to the inner sleeve by means of the said guide pin, and the inner sleeve has longitudinally extending slots in which the said guide pin may run so that the lock sleeve can partly rotate the inner lock sleeve by rotating the lock sleeve, partly can be displaced in the longitudinal direction relatively to the inner sleeve along the centre line in order to remove the projecting portion of the inner surface of the lock sleeve from the locking means in the direction away from the rear portion.

Alternatively, the engagement means are secured to the retention means and extend through longitudinally progressing slots of the lock sleeve arrangement.

Alternatively, the lock sleeve arrangement, i.e. primarily the lock sleeve and the inner sleeve, is provided with engagement means in the form of two inner engagement slots. The engagement slots progress parallely to the extension of the centre line CL and move in this direction when the lock sleeve is displaced.

Preferably, the engagement slots are in contact with a respective elevation of each projection (tap or sphere) 13. When the lock sleeve is rotated, edges of the engagement slots in turn influence the projections via the elevations. By its rotation about the centre line CL, the projection pulls in the nipple into the female part through engagement with the slots of the nipple. In that the elevation is integrated in the projection (the tap or sphere), a compact and easily mountable coupling is obtainable with fewer parts.

Preferably, the coupling is a coaxial coupling adapted for use in a rescue tool or other hydraulically driven tool. Thus, rescue personnel can handle its rescue equipment in a safe manner.

BRIEF DESCRIPTION OF THE DRAWINGS

The present invention will now be described by means of embodiments with reference to the attached drawings, in which schematically.

DESCRIPTION OF EMBODIMENTS

In the following some embodiments will be described in detail with reference to the drawings in which, for the sake of clarity and understanding of the invention, details without importance to the invention have been removed from the drawing. Some details with the same reference numeral may appertain to different embodiments.

Figure 1:
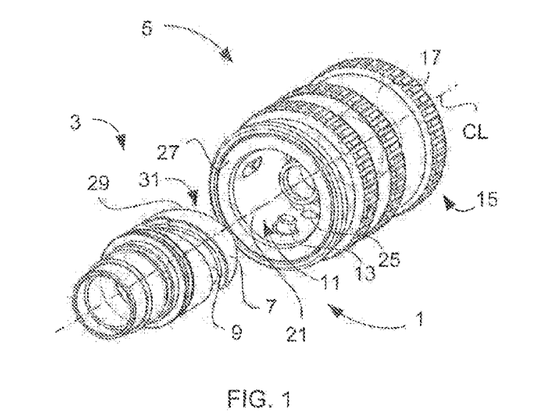
FIG. 1 shows a perspective of a coupling according to a first preferred embodiment.

FIG. 1 shows a perspective of a coupling 1 with safety lock according to a first preferred embodiment. The coupling 1 comprises a first (nipple part 3) and a second (female part 5) coupling part. The coupling 1 in FIG. 1 is adapted for use in a rescue tool (not shown). The nipple part 3 is connected to a first hose pack (not shown) leading to a rescue tool (not shown). The female part 5 is connected to a second hose packet (not shown) leading to a pressure source (not shown)

with oil. FIG. 1 illustrates a centre line (CL) along which the coupling 1 extends in coupled together position. An outer surface 7 of the nipple part 3 shows a helical slot 9 made in the outer surface 7. An inner surface 11 of the female part 5 has an inwards extending projection 13 or tap. The projection 13 is arranged for engagement with the helical slot 9. Through such engagement and rotation of the projection 13 rotational symmetrically about the centre line CL, the nipple part 3 can be passed into or out of the female part 5. The female part 5 has a, along the centre axis CL relatively to its rear portion 15 (which is clarified in more detail with reference to FIG. 3 below) displaceable lock sleeve 17 of a locking arrangement 19. The lock sleeve 17 comprises an inner surface 21 comprising a projecting portion. The projecting portion is constituted by a machined bevelled heel 23 provided for affecting a lock ball 25 so as to move in the radial direction at forwards and backwards movements of the lock sleeve 17 along the centre line CL relatively to the rear portion 15. Thus, the lock ball 25 is freely disposed in the female part 5 by resting loosely in a through-going hole 26 (see FIG. 4) made in an inner sleeve 27 of the sleeve arrangement 19. I.e., the retention means retaining the lock ball 25 are constituted by an inner sleeve 27 about which the lock sleeve 17 is displaceably arranged. The inner sleeve 27 is fixedly mounted at the rear portion 15. The outer surface 7 of the nipple part 3 comprises a collar 29 of the upper profile edge 31 of the helical slot 9 for receiving the lock ball 25. I.e. the profile edge facing away from the rear portion 15 of the female part 5. At completed coupling together, the lock ball 25 is pressed, by means of the heel 23, in the direction towards the centre line CL and towards the profile edge 31 where the lock sleeve 17 springs back to its starting position by means of the pressure spring 33, visible in FIG. 3. The lock sleeve 17 is tensioned in the direction towards the rear portion 15 by means of the pressure spring 33 for returning the lock sleeve 17 to its retracted position or starting position, whereby the heel 23 in this position gets to sit over the lock ball 25 and locks the lock ball 25 against the profile edge 31.

Figure 2:
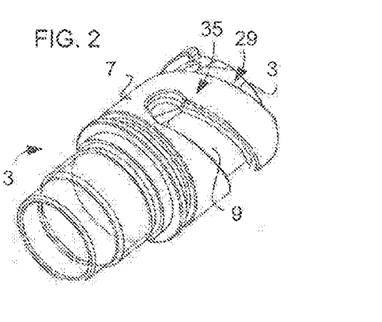
FIG. 2 shows a perspective of a first coupling part of the coupling in FIG. 1.

FIG. 2 shows a perspective view of the nipple part 3 of the coupling 1 shown in FIG. 1. It is shown in FIG. 2 that the helical slot ends by a bending angle 35 extending at an open angle a towards the main pitch angle of the helical slot. This embodiment will be explained in more detail in connection with FIGS. 6 and 7.

Figure 3:
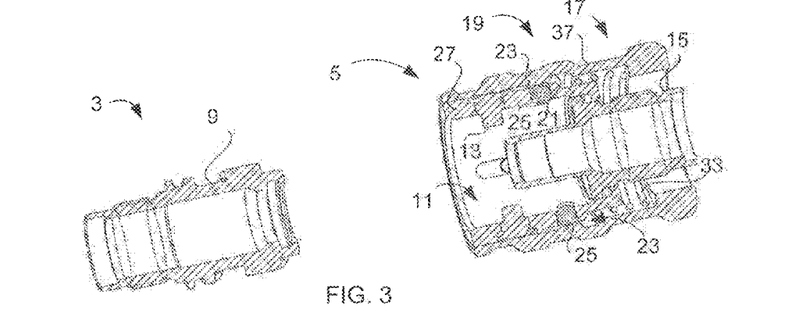
FIG. 3 shows a cross-section of the coupling in FIG. 1, uncoupled.
Figure 4:
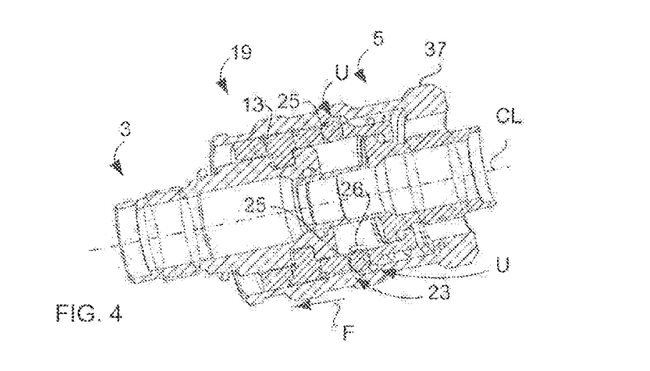
FIG. 4 shows a cross-section of the coupling in FIG. 1, at coupling together.

FIG. 3 shows a cross-section of the coupling in FIG. 1, coupled apart. In the cross-section of the nipple part 3, the helical slot 9 is seen clearly with the upper profile edge 31 with which the lock ball 25 gets into contact at completed coupling together. The coupling is provided with a helical slot 9 and an additional projection 13 in the form of a tap. This symmetrical arrangement of the projection 13 and the helical slot 9 favours an even coupling together and an uncomplicated coupling together, which positively affects safety. The lock sleeve 17 is in its starting position, and the heel 23 affects the lock balls 25 in peripheral inwards direction. An outer surface 37 of the lock sleeve arrangement 19 has a user-friendly handle. When personnel (not shown) push forward the lock sleeve F, or in the direction away from the rear portion 15 and towards the tensioned resilient force of the pressure spring 33, a space U is made to be positioned over the lock balls 25 whereby they can move freely in a peripheral direction outwards in the space U, which is shown in FIG. 4 with the coupling at coupling together.

Figure 5:
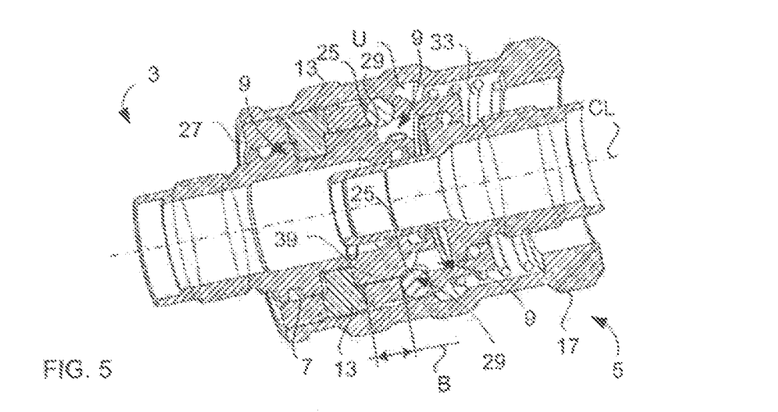
FIG. 5 shows a cross-section of the coupling in FIG. 1, after completed coupling together in locked position.

FIG. 5 shows a cross-section of the coupling 1 in FIG. 1 after completed coupling together and in locked position. The lock balls 25 abut against the collar 29 of the helical slot 9. As according to the this embodiment the helical slot extends about 360 degrees around the outer surface 7 of the nipple part 3, there will be a portion 39 between the slot 9 which exhibits constant width as seen in the longitudinal direction of the coupling. The portion 39 can be defined with a width B determined by the distance from the upper profile edge 31 facing away from the rear portion 15 at the inlet position to the slot 9 to the upper profile edge 31 facing the rear portion 15 at the end of the slot. This width B corresponds to the distance between the abutment surface of the lock ball and the abutment surface of the projection 13 against the portion 39, seen perpendicularly to the direction of the slot 9, which is explained in more detail in connection with the reference to FIG. 7 below. At uncoupling of the coupling 1, the lock sleeve 17 is pushed forwards in the direction away from the rear portion 15 against the resilient force of the pressure spring 33 so that the space U arrives at the lock ball 25, and the lock ball will "fall" out into the space U, which means that the lock ball is movable in the peripheral direction from the collar 29.

Figure 6:
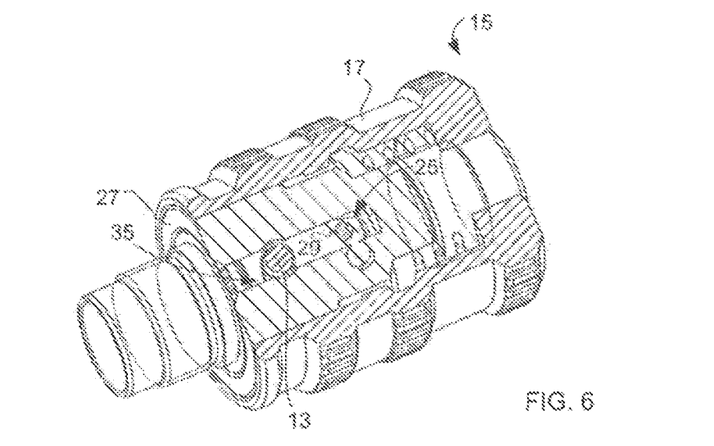
FIG. 6 shows a detailed view of the cooperation between projection and lock body in locked position.
Figure 7:
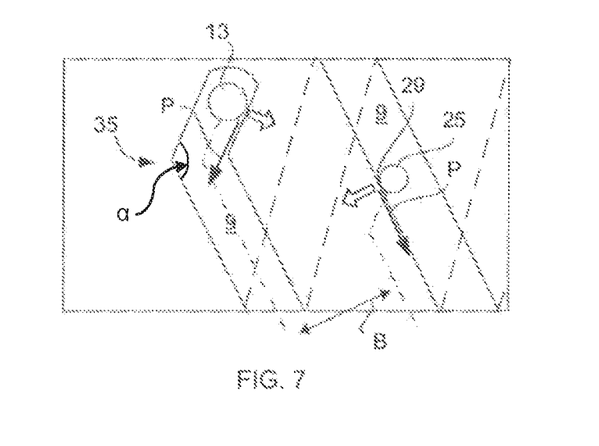
FIG. 7 illustrates the lock according to one embodiment.

FIGS. 6 and 7 show in more detail the cooperation between the projection 13 and the lock ball 25 in the locked position. When the rotation of the lock sleeve 17 has been completed the last stretch, the projection 13 of the inner sleeve 27 will change path so as to be linked by a bending angle 35 in the direction towards the rear portion 15 in order to create a bayonet lock with momentum of inertia and partial locking. This partial locking is completed in that at the same moment at which the projection 13 is controlled so as to change path, the lock balls 25 will also change path when they are transferred onto the top (shown by dotted line in FIG. 7) of the outer surface 7 of the nipple part 3 in a similar manner and fall down (or are pressed down by the heel 23) into the helical slot 9 and abut against the profile edge 29 of the slot 9. Since the profile edge 29 and the bending angle 35 extend at an acute angles to each other (the slot 9 of the nipple part 3 act in different directions at the locking points between the projection 13 and the lock balls 25, in accordance with arrows P shown in FIG. 7), which reduces tolerance sensitivity and enhances locking.

Figure 8:
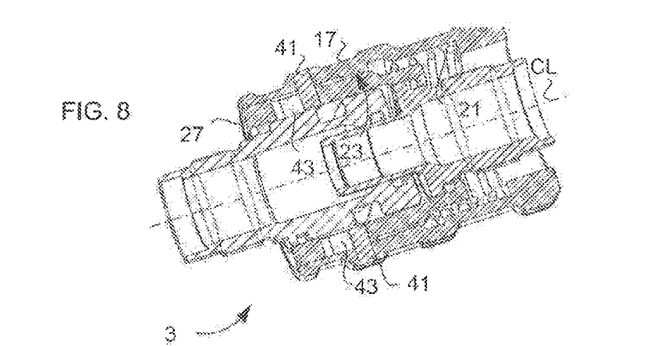
FIG. 8 shows a coupling according to a third embodiment with guide pin which transfers the rotational movement of the lock sleeve into rotational movement of the projection rotational symmetrically about the centre line.

FIG. 8 shows a coupling 1 according to a third embodiment with a guide pin 41 which transfers the rotational movement of the lock sleeve 17 made by users into rotational movement of the projection (not visible in FIG. 8) rotational symmetrically about the centre axis CL. The inner sleeve 27 is provided with longitudinally extending slots 43. The guide pin 41 is secured to the lock sleeve and is, through through-going slots 43, in rotation-stable engagement with the inner sleeve 27. In order for the lock sleeve 17 to be movable in the direction of the centre line CL, the longitudinally extending slots 43 are formed so that the guide pin may run freely in the inner sleeve 27 so that the lock sleeve 17 can be moved forwards and backwards relatively to the inner sleeve 27 simultaneously with the lock sleeve 17 being capable of transferring a rotational momentum to the inner sleeve 27 and the projection. A prompted movement forwards and backwards along the centre line CL serves to be able to remove/withdraw the projecting portion 23 of the inner surface 21 of the lock sleeve 17 from or abutting against the lock balls (not shown).

Figure 9:
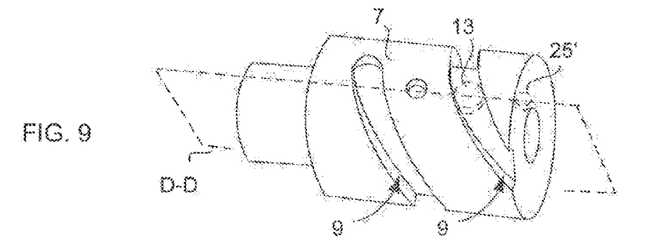
FIG. 9 shows a coupling according to a fifth embodiment, at commenced coupling together.
Figure 10A:
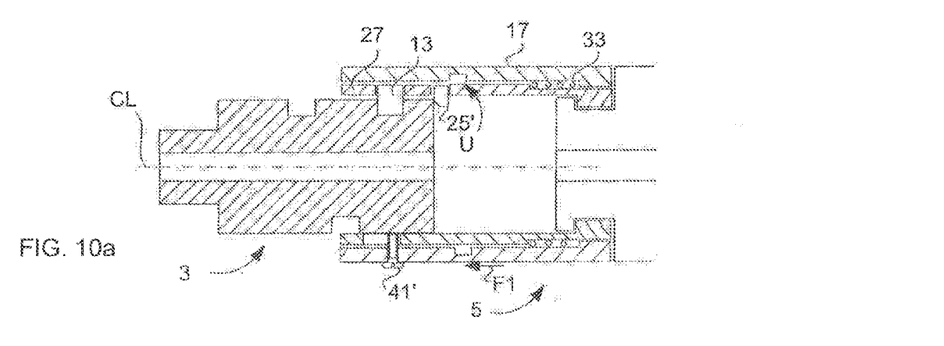
FIGS. 10a and 10b show cross-sections of the coupling in FIG. 9.
Figure 10B:
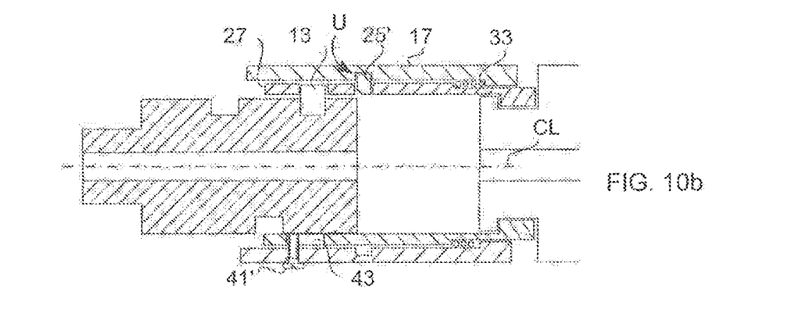

FIG. 9 shows schematically a male part 3' of a coaxial coupling 1 according to a fifth embodiment. The coaxial coupling is provided with ducts for pressure and return pipes (not shown). The female part comprises a by-pass valve (not shown) so that a user does not have to turn off a pressure source (not shown) at uncoupling. The male part 3' comprises an outer surface 7. A helical slot 9 is received in the surface 7. FIG. 9 only shows a projection 13 and a lock body 25' of the female part and the position thereof in relation to the male part 3 at commenced coupling together. The projection 13 has been rotated somewhat in the slot 9, and the lock body (here a pin) 25' abuts against the male part. FIG. 10*a* shows in cross-section D-D in FIG. 9 how this looks, but also its interaction with the female part. Clearly, the lock sleeve 17 at the position of the lock body 25' presses down the lock body, and the male part cannot be pulled into the female part. A user (not shown) must now, as shown in FIG. 10*b*, push forward (following arrow F1 in FIG. 10*a*) the lock sleeve 17 so that the space U of the lock sleeve 17 gets into position over the lock body 25' so that the lock body can freely be pushed down in the direction from the centre line CL in the space U when the male part 3' is driven into the female part 5', and the coupling together can proceed. Prompted rotational momentum is effected via screws 41' secured in the lock sleeve 17, and displacement of the lock sleeve 17 in the longitudinal direction relatively to the inner sleeve 27 can take place through the slots 43 arranged in the longitudinal direction.

Figures 11, 12, 13, 14, 15:
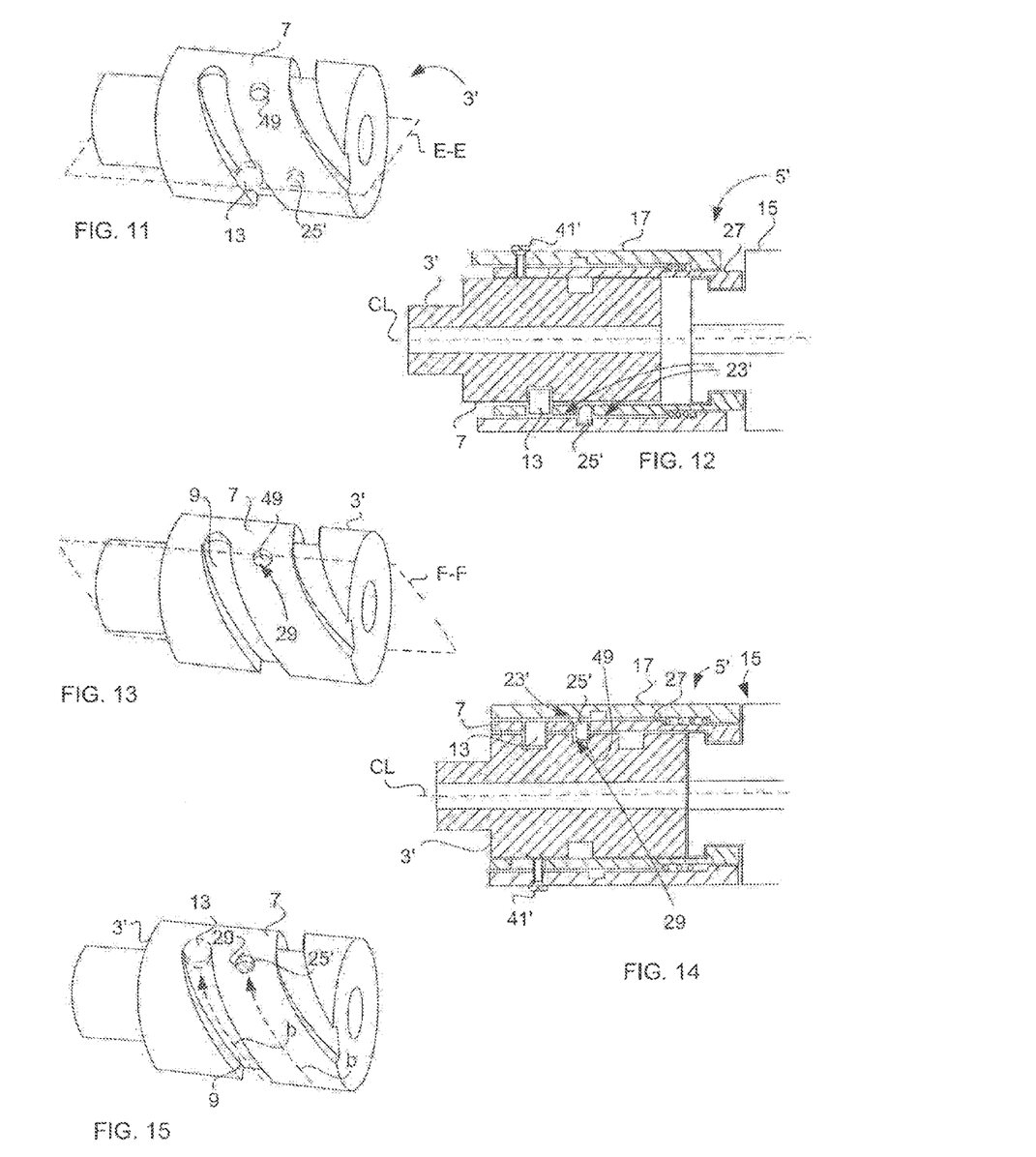
FIG. 11 shows the coupling in FIG. 9, at coupling together.
FIG. 12 shows a cross-section of the coupling in FIG. 11.
FIG. 13 shows the coupling in FIG. 9, at completed coupling together.
FIG. 14 shows a cross-section of the coupling in FIG. 13.
FIG. 15 shows the principle of the movement of the lock means across the outer surface of the first coupling part at the coupling together.

FIG. 11 shows the coupling 1 in FIG. 9 at coupling together, where the projection 13 is approaching the end of the slot 9 before the pulling together. At the same time it is illustrated here that the lock body 25' moves freely over the outer surface 7 of the male part 3' next to the slot 9. As shown in FIG. 12, along the section E-E, but together with the female part, the lock sleeve is pushed forwards due to the lock body 25' being in engagement with the space U of the lock sleeve 17. After completed rotation of the lock sleeve 17, the lock body 25' is pressed down in the recess 49 in the outer surface 7 having a collar 29 with which the lock body 25' is brought into engagement and prevents continued rotation of the lock sleeve 17 relatively to the male part 3', which is shown in FIG. 13 and in FIG. 14 along the Section F-F. At the same time, since the lock body falls down into the recess 49, the lock sleeve 17 can unhindered spring back over the lock body 25' in the direction towards the rear portion 15. The lock body 25' is positioned in the inner sleeve 27 which serves at retention means. The inner sleeve 27 is connected to the rear portion 15. The outer surface 7 of the male part 3' thus comprises the collar 29 for receiving the lock body 25' affected by the projecting portion 23' at the said coupling together. FIG. 14 thus shows the coupling in FIG. 9 at completed coupling together where the lock body 25' has been pressed down into the recess 49 by means of the projecting portion 23' (projecting as compared to the space U) of the lock sleeve 17, and the lock sleeve automatically springs back to its starting position for secure locking of the coupling.

FIG. 15, supported by FIG. 14, shows the principle of the path of movement of the lock body 25' across the outer surface 7 of the male part 3' before locking is effected by means of the lock body 25'. The projection 13 and the lock body 25' move in parallel paths next to each other at the rotation of the lock sleeve 17 and the inner sleeve 27. A user rotates the lock sleeve (after having moved it forwards) in which the inner sleeve 27 via the screws 41' secured to the lock sleeve 17 is rotated by the rotation of the lock sleeve. The inner sleeve 27 exhibits the longitudinal slot 43 with which the screw 41' engages. The projection 13 and the lock body 25' rest at the inner sleeve 27 in each separate through-going recess in the mantel wall of the inner sleeve 27 and perform at the rotation parallel rotational symmetrical paths of movement which, when the projection 13 engages with the slot 9 and pulls in the male part in the female part, projects inclined parallel paths b across the outer surface 7 of the male part 3', marked with dashed arrows in FIG. 15.

Figure 16:
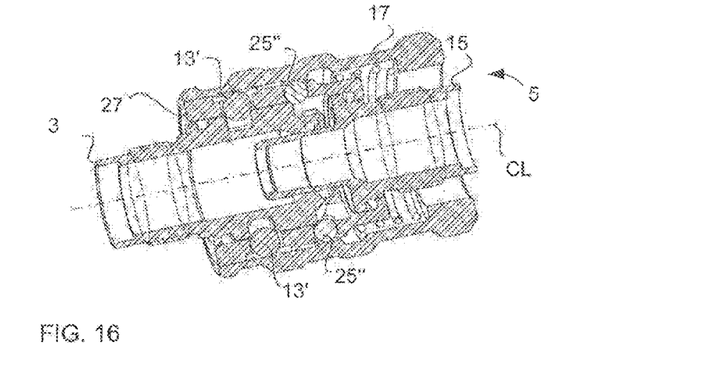
FIG. 16 shows a coupling according to a sixth embodiment.

FIG. 16 shows a coupling 1 according to a sixth embodiment. The coupling is provided with three lock balls 25", of which only three are visible. The three lock balls 25" are placed symmetrically about the centre line CL. Likewise three symmetrically placed projections in the form of three drive balls 13' are arranged at the inner sleeve 27. The three drive balls 13' engage with helical slots 9 at the coupling together in a manner similar to what is described above.

Figure 17A:
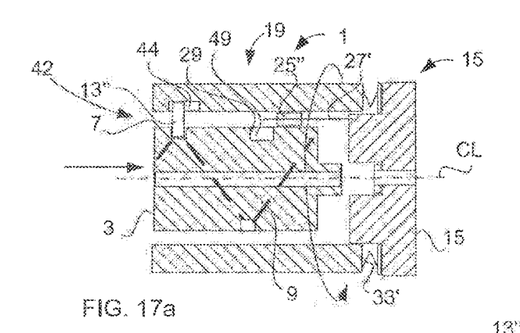
FIGS. 17a to 17c show a coupling according to a seventh embodiment.
Figure 17B:
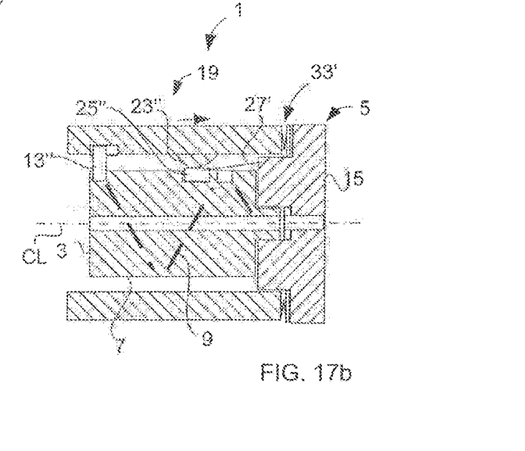
Figure 17C:
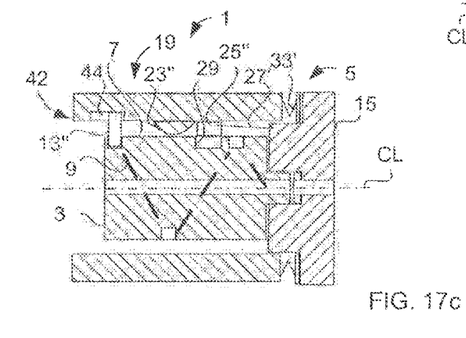

FIGS. 17*a* to 17*c* show a coupling 1 according to a seventh embodiment. This coupling also has a second coupling part 5 comprising a lock sleeve arrangement 19. The lock sleeve arrangement 19 is displaceably arranged relatively to its rear portion 15 along the centre axis CL. The lock sleeve arrangement 19 is provided with an inwards projecting portion in the form of a drive pin 13". A lock heel 25" provided in the second coupling part 5 is movably arranged relatively to the lock sleeve arrangement 19. By means of retention means in the form of a bendable rod 27", the lock heel 25" is connected to the rear portion 15. The outer surface 7 of the first coupling part 3 comprises a collar 29 for receiving the lock heel 25" when the lock sleeve arrangement 19 is rotated to its final coupled together position. A projecting portion in the form of a cam surface 23" causes the lock heel 25" to fall into the recess 49 to lock the coupling 1. According to this embodiment, the drive tap 13" serves as engagement means 42 being movable in the direction of the centre axis CL when rotation of the lock sleeve arrangement 19 takes place. The engagement means are constituted by the drive tap 13" and a slot 44 extending longitudinally in the direction of the centre line CL, which interact at displacement of the lock sleeve arrangement 19 forwards in the direction from the rear portion in order to allow displacement of the cam surface 23". A tension spring plate serves for the return resilience of the sleeve arrangement 19 (see FIG. 17*c*) to its original position in which the cam surface 23" presses the lock heel 25" in the direction towards the centre line CL.

Figure 18A:
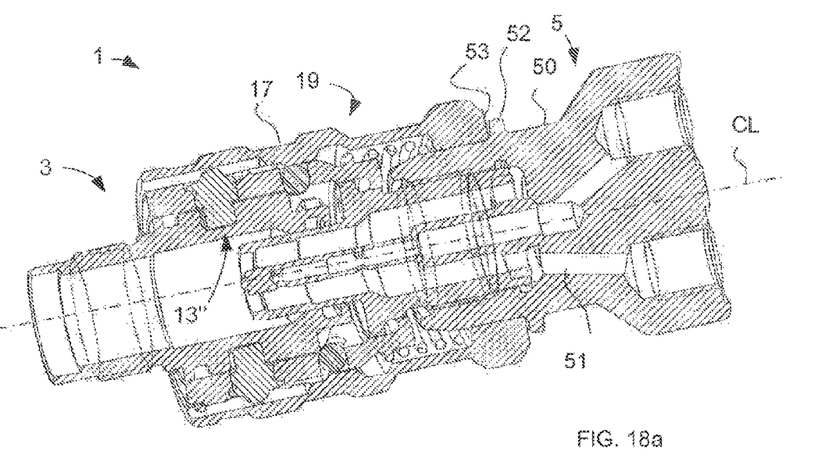
FIGS. 18a-18b show further embodiments.

FIG. 18*a* shows schematically a further embodiment of the coupling 1. The coupling 1 comprises the nipple part 3 and the female part 5. The female part comprises a rear portion 50 being connected to a second hose pack (not shown) leading to a pressure source (not shown) with oil. The coupling is a so-called coaxial coupling and is provided with ducts 51 in the rear portion for connection to pressure and return pipes (not shown). FIG. 18*a* shows the coupling after completed coupling together and in locked position. A centre line CL is shown in the figure along which line the coupling 1 extends in coupled position. An annular heel 52 is provided in order to prevent the lock sleeve 17 from being pressed backwards in the direction towards the rear portion 50. The rear end of the lock sleeve 17 is provided with a collar 52 which gets into engagement with the heel 52 in coupled position.

Figure 18B:
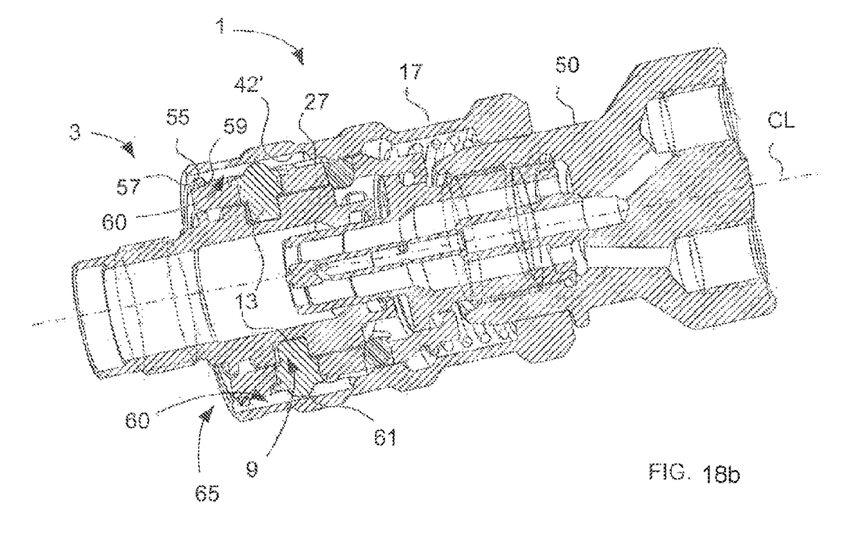

FIG. 18*b* shows a further embodiment in which the front end of the lock sleeve 17 is provided at the inner side with a lock ring 55 in an inner slot 57. The lock ring 55 gets into engagement with a front collar 59 of the inner sleeve 27 in order to prevent the lock sleeve 17 from being pressed backwards in the direction towards the rear portion 50.

An embodiment of the coupling shown in both FIGS. 18*a* and 18*b* relates to a lock sleeve arrangement, that is primarily the lock sleeve 17 and the inner sleeve 27, is provided with engagement means 42' in the form of two inner engagement slots 60. The engagement slots 60 extend parallely to the extension of the centre line CL and move in that direction when the lock sleeve 17 is displaced. A rotational movement of the lock sleeve 17 (after pushing forwards the lock sleeve 17) caused by the user transfers the rotational movement to the projections (taps) 13 resting in the inner sleeve 27 (also called inner front portion) for engagement with the slot 9 of the nipple 3, caused by the engagement slots 60 being in contact with an elevation 61 of the projections (taps) 13. When the lock sleeve 17 is rotated, edges of the engagement slots 60 in turn influence the projections 13 via the elevations 61, the said projection 13 with the elevations 61, in turn by the rotation thereof about the centre line CL, pulling in the nipple 3 into the female part 5 through engagement with the slots 9 (the edges of the slots) of the nipple 3. By integrating the elevation 61 in the projection (tap) 13, a compact and easily mountable coupling 1 can be achieved with fewer parts. Advantageously, the engagement slots 60 are open towards the front end 65 of the lock sleeve 17, and at mounting the inner sleeve with taps can be pushed in in a simple manner. Mounting of the lock ring 55 ensures that the inner sleeve 27 falls out simultaneously with also serving to prevent the lock sleeve 17 from being pushed backwards too far over the rear portion 50.

The present invention is, of course, not limited to the embodiments described above, but several possible modifications or combinations thereof are obvious to the person skilled in the field without departing from the inventive idea set forth by the attached patent claims. The coupling may be adapted for transferring different types of medium, such as air, pressurized air, gas, oil, liquids, such as water, etc. The number of lock bodies may be one or more, such as two or four, and may designed with conical, cylindrical, spherical form, or as rectangular box. Uncoupling may be effected in that the lock sleeve is displaced in the direction towards the rear body and is then rotated clockwise. The coupling may be a so-called coaxial coupling provided with ducts for pressure and return pipes.

The invention claimed is:

1. A coupling comprising:
a first and a second coupling part being adapted for coupling together and uncoupling along a centre axis (CL) extending through the coupling, an outer surface of the first coupling part comprising at least a recessed helical slot, an inner surface of the second coupling part having at least one projection extending inwards for engagement with the recessed helical slot, wherein the second coupling part comprises a lock socket arrangement being displaceable relatively to a rear portion of the second coupling part along the centre axis, having an inwards projecting portion, at least one lock body arranged in the second coupling part being movably arranged relative to the lock socket arrangement and connected by retention means to the rear portion, the outer surface of the first coupling part comprising a collar for receiving the lock body affected by the inwards projecting portion when the first coupling part and the second coupling part are coupled together, wherein the retention means comprises an inner sleeve about which a lock socket of the lock socket arrangement is displaceably arranged, and wherein the retention means further comprises engagement means transferring rotational movement of the lock socket to the inner sleeve.

2. The coupling according to claim 1, wherein the lock socket arrangement is tensioned in a direction towards the rear portion by means of a spring for returning the lock socket arrangement to an original position in which the projecting portion gets into contact with the lock body.

3. The coupling according to claim 1, wherein the lock socket arrangement is provided with a space (U) so that in a projected position of the lock socket arrangement, the space (U) allows the lock body to move in peripheral direction from the collar.

4. The coupling according to claim 1, wherein the retention means are designed so that the collar of the lock body corresponds to a profile edge of the recessed helical slot.

5. The coupling according to claim 1, wherein the recessed helical slot ends by a bending angle extending by an open angle towards a main pitch angle of the recessed helical slot.

6. The coupling according to claim 1, wherein the lock body is constituted by a ball or a tap.

7. The coupling according to claim 1, wherein the at least one projection comprises a tap or a ball.

8. The coupling according to claim 1, wherein the outer surface of the lock socket arrangement comprises a user friendly handle.

9. The coupling according to claim 1, wherein the lock socket arrangement by means of the engagement means being adapted for affecting the projection for engagement with the recessed helical slot, said engagement means being adapted so as to be movable in along a direction of the centre axis (CL).

10. The coupling according to claim 9, wherein the engagement means being secured to the lock socket arrangement and extending through longitudinally extending slots of the retention means.

11. The coupling according to claim 9, wherein the engagement means being secured to the retention means and extending through longitudinally extending slots of the lock socket arrangement.

12. A rescue tool, or other hydraulically driven tool, comprising the coupling according to claim 1, wherein the coupling is a coaxial coupling.

* * * * *